UNITED STATES PATENT OFFICE.

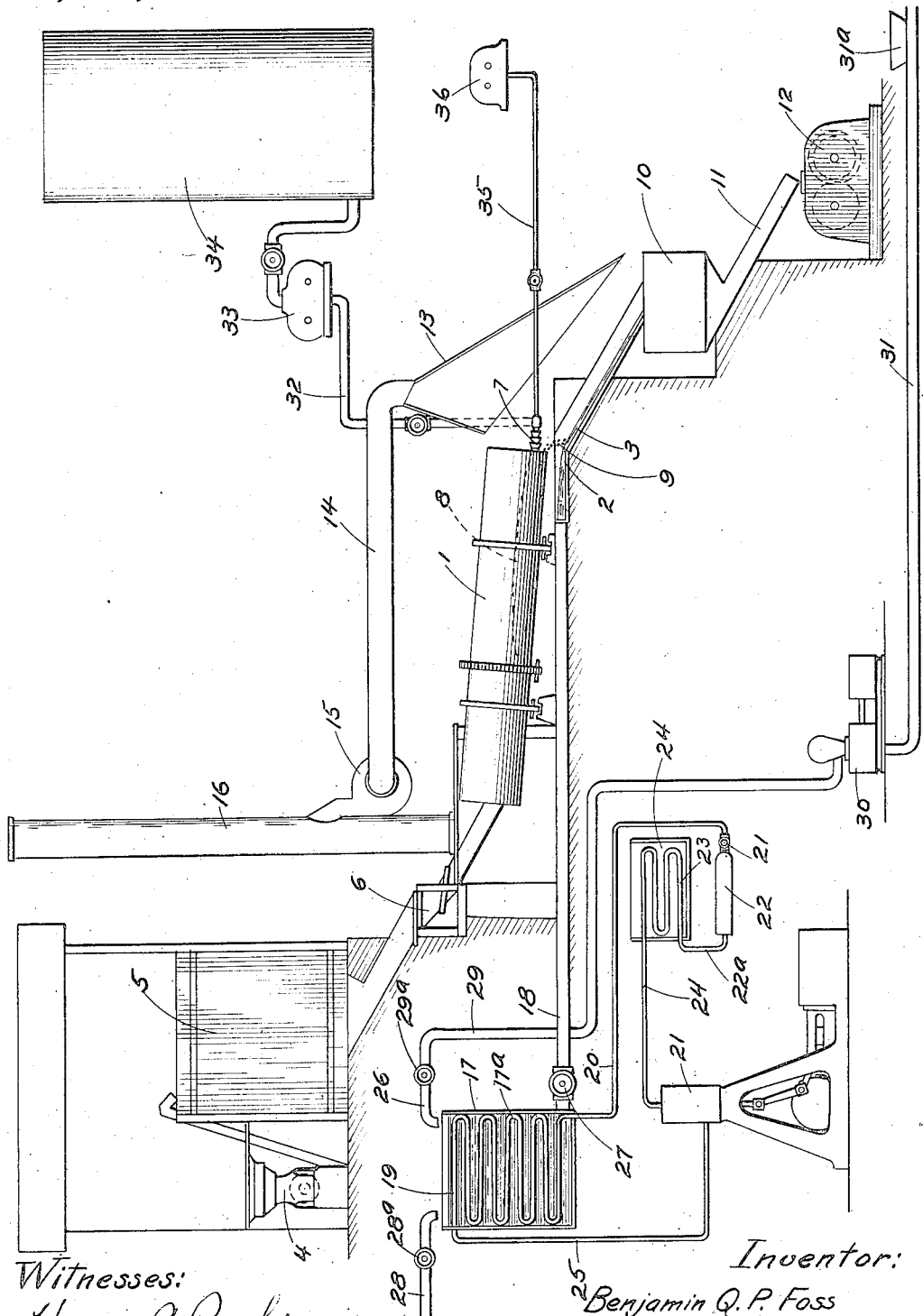

BENJAMIN Q. P. FOSS, OF CHICAGO, ILLINOIS, ASSIGNOR TO THE FOSS INTERNATIONAL ORE REDUCTION COMPANY, OF CHICAGO, ILLINOIS, A CORPORATION OF ARIZONA.

ORE-REDUCING PROCESS.

1,311,645.  Specification of Letters Patent.  Patented July 29, 1919.

Application filed June 25, 1911. Serial No. 634,926.

*To all whom it may concern:*

Be it known that I, BENJAMIN Q. P. FOSS, a citizen of the United States, residing at Chicago, in the county of Cook and State of Illinois, have invented certain new and useful Improvements in Ore-Reducing Processes, of which the following is a specification.

The object of my invention is to provide a new process for reducing hard, refractory ores, as well as all other kinds. By means of my process I am able to avoid the necessity of using the heavy mills now used, which are known as stamp mills, tube mills, rotary mills, etc. I have discovered a cheap and efficient process by which low grade as well as high grade ore may be worked, and also much of the waste materials now discarded as are unworkable. More particularly, my process is a discovery by which I can render all ore very friable, in which condition it is crushed with ease and facility by an ordinary crushing apparatus with little wear in said apparatus. My improved process will be more fully described in the following specification.

The accompanying drawing will illustrate apparatus which may be used in carrying out my process. The process is not necessarily associated with the particular apparatus illustrated, but may be carried out by any one of a variety of appliances.

Referring to the accompanying drawing, the novel feature of the process consists in first heating the ore suddenly to a high degree in a rotary kiln 1, and then allowing the heated material to drop into a bath of cold water 2. This bath of cold water is preferably a stream of running water, which is admitted into a sloping chute 3. The water is introduced into this chute in as cold a condition as possible. For this purpose, in many localities, I find it necessary to utilize a refrigerating apparatus. I use the same water repeatedly. After it has left the crushing mill 12 and other appliances in the reducing plant, I conduct it to a refrigerating apparatus which is indicated in the drawing at 17. From the refrigerating apparatus, it may pass to the inclined chute 3 as before. A suitable conduit 18 may lead from the refrigerating apparatus to said chute.

This refrigerating apparatus may be composed of any well-known form, the elements of one of which forms I have illustrated diagrammatically in the drawings. The tank 17$^a$ may receive the water to be cooled and in this tank is placed a coil or group of pipes 19. These are the cooling pipes which receive ammonia gas or other refrigerating medium through a pipe 20 from an expansion valve 21. The gas flows through this expansion valve from a supply tank 22 which receives the liquid ammonia through a pipe 22$^a$ from the condenser 23.

A compressor 21 forces the ammonia gas under pressure through a pipe 24 into the coils of the condenser 23. These coils are kept cool by means of cold running water in the tank 24 in which the said coils 23 are submerged. In some cases what is known as an open air condenser may be substituted for the form shown at 23. The expanded gas in the coils 19 returns to the compressor 21 through the pipe 25. A suitable engine or other motor 21$^a$ drives the compressor.

The water which I use to chill the heated ore may be derived from any natural source through a pipe 28 if such source furnishes a plentiful supply. If it does not I use the same water repeatedly by conducting it through a suitable pipe or conduit to the tank 17$^a$. The waste water which flows from the various appliances in the plant may be collected in suitable receptacles such as shown at 31$^a$ and lead to a pump 30 through a pipe 31. This pump may raise the water through a pipe 29 to the tank 17$^a$. Suitable valves 28$^a$ and 29$^a$ may shut off one or the other of said pipes depending upon the source of supply.

This very sudden cooling effect upon the heated material brings about a friable condition of the ore. By this process I am able to produce what is known as an abrasion pulp as distinguished from a pulp produced by percussion. I thus avoid the slimes that are produced in the percussion or stamping process. This pulp is amenable to the cyanid process. I have discovered that very hard and refractory ores, which resist the crushing effect of heavy stamp mills and other crushing machinery, are reduced to a soft, friable condition by this process.

In order that the sudden cooling effect may be made as great as possible, I first crush the ore to small masses of approximately such size as will pass through a screen of one inch mesh. This preliminary breaking operation I perform in a suitable crushing mill 4 of the usual construction. The ore thus broken is delivered to a storage bin 5 from which it may be delivered to the drier 1 by a suitable feeding apparatus 6.

The drier 1 should be of such construction as will cause the broken ore to be thoroughly heated to a temperature which causes the points or angles of the pieces to appear slightly red. By heating to this temperature, acidity in the ore is removed, and sulfur, arsenic and other undersirable components are eliminated. This makes the pulp fully amenable to the cyanid process, or to amalgamation or concentration. It is held in the furnace for a sufficient length of time to thoroughly drive out volatile components. Tests show that two minutes are sufficient. I find that a rotary kiln such as that illustrated at 1, in which the flame is admitted at the lower end, gives the desired results. I have further found that unrefined producer gas is the cheapest and best for the purpose and that the gas burner which forms the subject-matter of Letters Patent No. 992,181, for gas burner, granted to me recently, gives the best results. This gas burner is illustrated at 7 in the drawing, and the flame which it produces is indicated by the dotted lines 8 in the kiln 1. The burner may be supplied with gas through a pipe 32 leading from the blower 33, which in turn receives gas from the producer 34. The supply of air for this burner may come through a pipe 35 leading from a blower 36.

The fumes and poisonous gases arising from the heated ore as it strikes the cold bath are collected by the hood 13 and are drawn off through the pipe 14 by the exhauster 15. They are then discharged into the stack 16.

The heated and dried material is shown at 9 dropping out of the end of the kiln into the stream of cold running water 3. At this instant the sudden cooling effect produces a violent contraction of the ore, following the previous expansion due to the heat, which converts it into a friable condition. The combined streams of ore and water may then drop into the hopper 10 from which the ore may flow through a chute 11 to a crushing apparatus 12. This crushing apparatus reduces the ore to any desired degree of fineness capable of going through a screen of fine mesh. My process enables the crusher to produce a much finer product than has heretofore been accomplished.

In my process the same water may be used repeatedly by passing it through a refrigerating apparatus, and hence a much smaller quantity of water is used per ton of ore reduced as compared to other processes.

When treated as above described the crushing apparatus 12 has much less work to do, for the reason that the ore is in a soft, friable condition. The remainder of the reducing plant may be the same as usual, the process from this point forward being unchanged. After the powdered ore leaves the crushing rolls, any known process of reclaiming the metal can be employed. With my improvement in the process, many advantages are secured, among which is that it overcomes the sliming of the ore, and it matters not what method is used in reclaiming the metal, the fine powder which I produce will permit the highest extraction of values.

By using unrefined producer gas I can dry the ore much more cheaply than it can be done with a crude oil fire, no matter what the locality is. I burn producer gas by means of a special burner of improved construction, in which it is not necessary to refine the gas before it is burned. I burn the gas in its rough or crude state, thereby getting the greatest amount of heat at the least cost.

This process is not a chemical or disintegrating process. It is wholly a physical and thermal process for reducing the ore to a fine powder and preparing it for treatment by any known process for reclaiming the metals. By this process the highest extraction of values from the ore treated is accomplished. I am able to do this at a much lower cost than now prevails. I am also able to build a plant in which this process is used at a much lower initial cost.

In this process the moisture and volatile substances are driven out of the pores, into which the cooling medium is absorbed, the action then taking place serving to unbind the ore.

While I have described my improved process more or less precisely with respect to the various steps, and have described somewhat in detail a combination of appliances by which it may be carried out, I do not wish to be limited thereto unduly, as I contemplate changes which do not depart from the spirit of my invention as defined by my claims.

I claim:

1. The process of reducing hard materials to a friable condition, which consists in first breaking said materials into pieces of small size, then exposing said pieces to a gas flame for a time sufficient to drive out moisture and volatile substances, said flame being produced by the combustion of fuel gas generated immediately before its arrival at and adjacent to said flame, and then suddenly submerging said materials in a continuously flowing cooling medium before a fusing or softening effect has been produced in said materials.

2. The process of reducing hard materials to a friable condition, which consists in first breaking said materials into pieces of small size, then exposing said pieces to a flame in a confined space, said flame arising from the combustion of unrefined gas generated immediately before its arrival at and adjacent to said flame, said pieces being kept in motion, said flame being caused to impinge upon said materials and upon said body, and then suddenly and immediately cooling said pieces after the moisture and volatile substances therein have been removed by said heat.

3. The process of reducing hard materials to a friable condition, which consists in first breaking said materials into pieces of small size, then exposing said pieces to the flame arising from the combustion of unrefined gas generated immediately before its arrival at said flame, said pieces being given a progressive tumbling motion to expose them uniformly to the influence of said source of heat, said flame being caused to impinge upon said pieces and upon said body, and then immediately and suddenly cooling said pieces after the moisture and volatile substances therein have been driven off by said heat.

4. The process of reducing hard materials to a friable condition, which consists in first breaking said materials into pieces of small size, then feeding said pieces continuously through an inclosed heated space and agitating said pieces therein, exposing said pieces to the influence of a flame of combustible gas generated immediately before its arrival at said flame which impinges upon them while said pieces are passing through said space, and then causing said pieces to drop out of said space into a continuously flowing cooling medium before a fusing or softening effect has been produced in said pieces.

5. The process of reducing hard materials to a friable condition, which consists in first breaking said materials into pieces of small size, then feeding said materials continuously through an inclosed heated space and agitating said pieces therein, exposing said pieces to the influence of an incandescent flame of combustible gas which impinges upon them while said pieces are passing through said space until the corners or angles of said pieces appear slightly red, and then causing said pieces to pass from said space into and with a continuously flowing cooling medium.

6. The process of reducing hard materials to a friable condition, which consists in feeding said materials continuously through a heated space, exposing said materials therein to an incandescent flame for a time sufficient to drive off volatile matter, and then immediately and suddenly cooling said materials.

7. The process of reducing hard materials to a friable condition, which consists in first breaking said materials into pieces of small size, then giving said pieces a progressive tumbling motion in a confined space and exposing them in said space to an incandescent flame which impinges upon them, said pieces being passed through said heated space in a relatively short space of time and being discharged therefrom when the corners or angles of said pieces appear slightly red into a continuously flowing cooling medium, said pieces being moved bodily with the cooling medium.

8. The process of reducing hard materials to a friable condition, which consists in first breaking said materials into pieces of small size, then passing said materials through an inclosed heated space and keeping them continuously in motion in said space while subjecting them to the heat of an incandescent flame impinging thereon, said pieces being retained in said space for a relatively short period of time, and being discharged therefrom when the corners or angles of the pieces appear slightly red into a cooling medium.

In testimony whereof, I have subscribed my name.

BENJAMIN Q. P. FOSS.

Witnesses:
HENRY A. PARKS,
ANNA L. WALTON.